US006135889A

United States Patent [19]

Salviato

[11] Patent Number: 6,135,889

[45] Date of Patent: Oct. 24, 2000

[54] DEVICE FOR SUBJECTING A SHAFT TO A COMBINED SIMPLE ROTATION AND ALTERNATING ROTATION OF LIMITED EXTENT ABOUT ITS OWN AXIS

[75] Inventor: Tiziano Salviato, Dolo, Italy

[73] Assignee: HOLMAC S.a.s. di Gastaldi Christian & C., Padua, Italy

[21] Appl. No.: 09/263,479

[22] Filed: Mar. 8, 1999

Related U.S. Application Data

[63] Continuation-in-part of application No. 08/800,493, Feb. 14, 1997, abandoned.

[30] Foreign Application Priority Data

Feb. 20, 1996 [IT] Italy ................................ PD960010 U

[51] Int. Cl.[7] ............................ F16D 3/12; A01B 39/00; F16H 1/16

[52] U.S. Cl. ............................ 464/66; 464/73; 464/160; 74/411; 74/425; 74/606 R; 172/40

[58] Field of Search ................................ 464/52, 61, 65, 464/66, 67, 68, 62, 76, 73, 81, 160, 161; 74/411, 425, 606 R; 172/92, 40, 94

[56] References Cited

U.S. PATENT DOCUMENTS

| | | | |
|---|---|---|---|
| 4,770,055 | 9/1988 | Chevance et al. | 74/411 |
| 5,771,744 | 6/1998 | Canova et al. | 74/411 |

*Primary Examiner*—Lynne H. Browne
*Assistant Examiner*—Kenneth Thompson
*Attorney, Agent, or Firm*—Guido Modiano; Albert Josif; Daniel O'Byrne

[57] ABSTRACT

A device for subjecting a shaft to a combined simple rotation and alternating rotation of limited extent about its own axis, the device including two supporting plates which rotate with the shaft coupled to a vibration generator and, between the plates, a part of a gear system which rotates freely with respect to the shaft and is associated with rotation actuation motor. Two first slotted holes are formed in each one of the plates so that they are diametrically opposite with respect to the shaft, the first slotted holes being arranged, upon assembly, at second slotted holes formed in the gear system, elastic compression springs being rigidly coupled between the first and the second slotted holes.

19 Claims, 6 Drawing Sheets

DEVICE FOR SUBJECTING A SHAFT TO A COMBINED SIMPLE ROTATION AND ALTERNATING ROTATION OF LIMITED EXTENT ABOUT ITS OWN AXIS

CROSS-REFERENCE TO RELATED APPLICATIONS

This application is a continuation-in-part of prior application Ser. No. 08/800,493 filed on Feb. 14, 1997, now abandoned.

BACKGROUND OF THE INVENTION

The present invention relates to a device for subjecting a shaft to a combined simple rotation and alternating rotation of limited extent about its own axis.

The device can be applied particularly, but not exclusively, to a mechanical plant uprooting system.

In order to remove plants from soil it is in fact conventionally necessary to make an appropriate sod of said soil remain with the roots.

This operation, known as balling and burlapping, currently entails use of a curved blade which is subjected to a combined simple rotation and alternating rotation of limited extent about its own axis.

The simple rotation, combined with the alternating vibrating motion, allows the blade to easily penetrate the soil and to isolate the sod from said soil.

Both movements are actuated by corresponding actuation means which can be constituted, merely by way of example, by a hydraulic motor for the rotary motion and by a generator of torsional oscillations for the vibrating motion.

The main problem affecting currently commercially available devices resides in the breakages that occur in the elements that associate the blade supporting shaft with the actuation means and by the considerable dimensions of the devices.

SUMMARY OF THE INVENTION

A principal aim of the present invention is to provide a device for subjecting a shaft to a combined simple rotation and alternating rotation of limited extent about its own axis which is strong and is in any case not subject to fatigue failure of elements during use.

Accordingly, an object of the present invention is to provide a device which can be conveniently associated with equipment for performing the balling and burlapping of plants.

Another object of the present invention is to provide a device which is structurally simple and can be produced with conventional equipment and facilities.

Another object is to provide a compact device.

Another object of the present invention is to provide a device the structure whereof requires a smaller number of constructive elements than required for current devices, with a consequent cost reduction.

In accordance with one preferred aspect of the invention, there is provided a device for subjecting a shaft to a combined simple rotation and alternating rotation of limited extent about its own axis, including two supporting plates which rotate with the shaft coupled to a vibration generator and, between the plates, a part of a gear system which rotates freely with respect to the shaft and which is associated with a rotation actuation device. Two first slotted holes are formed in each one of the plates so that they are diametrically opposite with respect to the shaft, such slotted holes being arranged, upon assembly, at second slotted holes formed in the gear system, and elastic compression elements are rigidly coupled between the first and the second slotted holes.

According to another aspect of the invention, there is provided a blade actuator having a shaft rotatable about its shaft axis with a combined simple rotation and an alternating rotation of limited extent, and a blade connected to the shaft so as to be also rotatable substantially about the shaft axis with the combined simple rotation and the alternating rotation of limited extent. The blade actuator further includes: two supporting plates coupled directly in rotation with the shaft; a vibration generator coupled to the shaft and subjecting the shaft to the alternating rotation of limited extent about the shaft axis; a gear mounted between the two supporting plates such that the plates are positioned at respective opposite faces of the gear, and the gear being freely rotatable with respect to the shaft and with respect to the two supporting plates about the shaft axis; a rotation actuation device associated with the gear for rotating the gear about the shaft axis; two pairs of first slotted holes, one respective pair of the two pairs of first slotted holes being formed in a respective one of the plates and the two pairs of first slotted holes being mutually diametrically opposite with respect to the shaft, and the two pairs being positioned mutually facing in a direction parallel to the direction of the shaft axis; a pair of second slotted holes formed in the gear such that the two pairs of mutually facing first slotted holes are arranged in a position corresponding to that of the second slotted holes; two pairs of shaped elements, each pair of the two pairs of shaped elements comprising two shaped elements which are mutually oppositely arranged in contact with respective mutually opposite end profile surfaces of one of the pair of slotted holes and of respective mutually facing first slotted holes of the two supporting plates; and elastic elements which are coupled between respective facing surfaces of each of the two pairs of shaped elements.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein.

DESCRIPTION OF THE PREFERRED EMBODIMENTS

Figure 1:
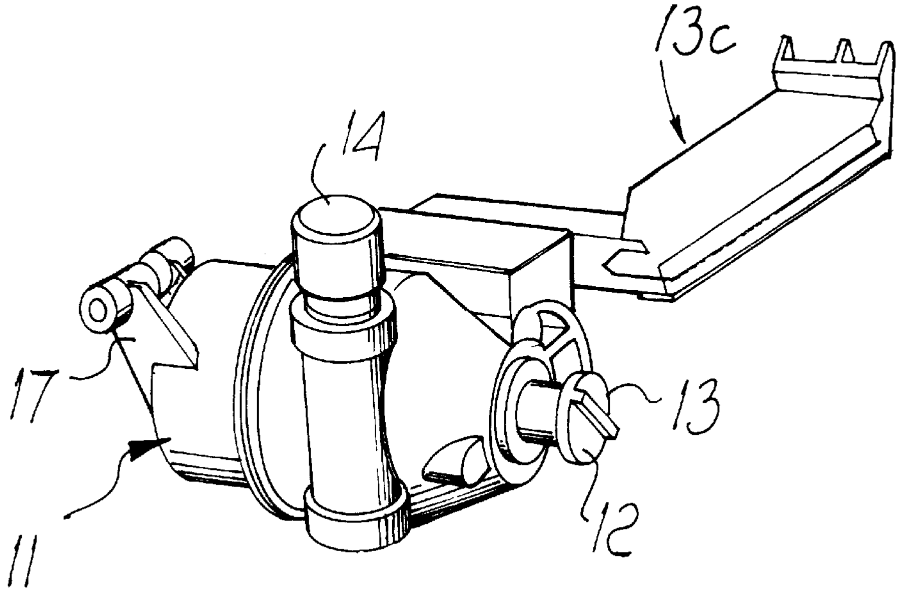
FIG. 1 is a perspective view of a device according to the invention.
Figure 2:
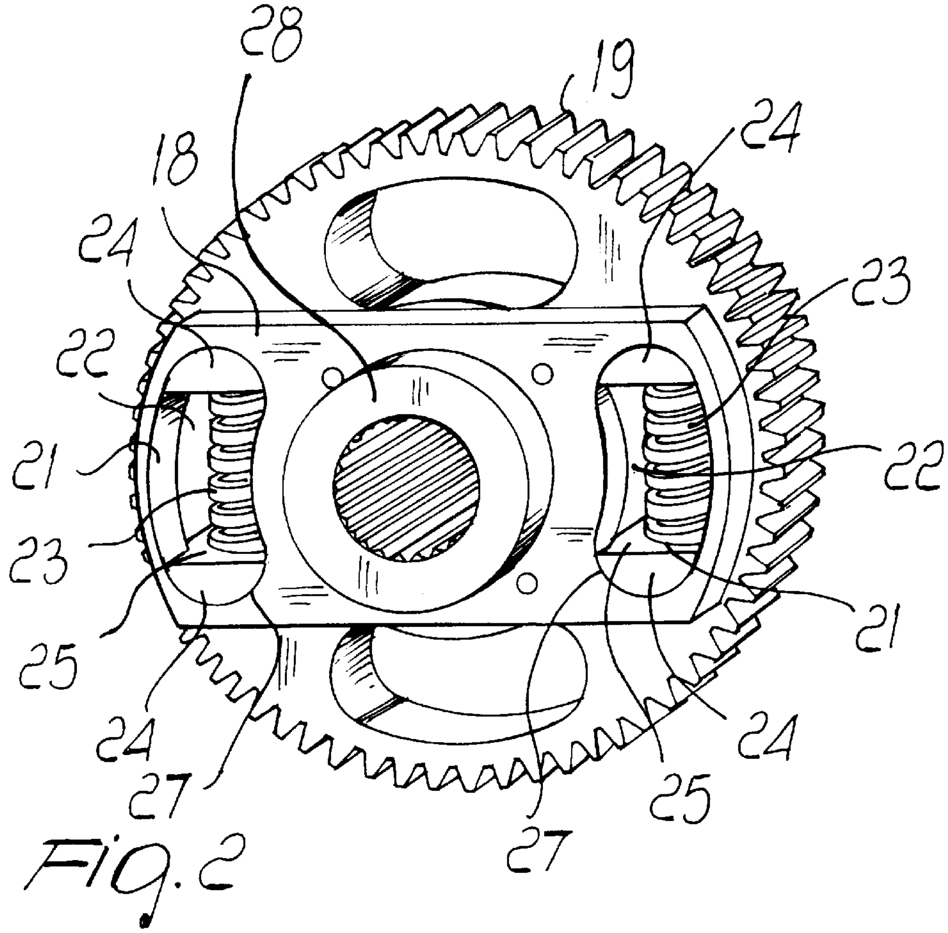
FIG. 2 is a perspective view of a detail of the device of FIG. 1.
Figure 3:
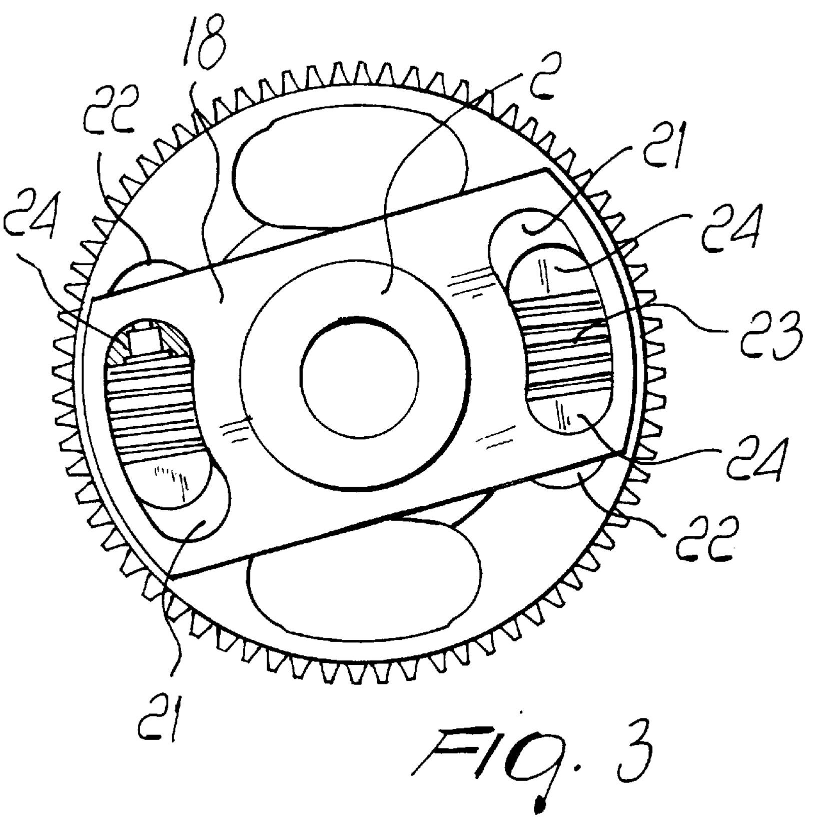
FIGS. 3, 4, and 5 are orthographic projection views of the detail of FIG. 2, shown in three different operating steps.
Figure 4:
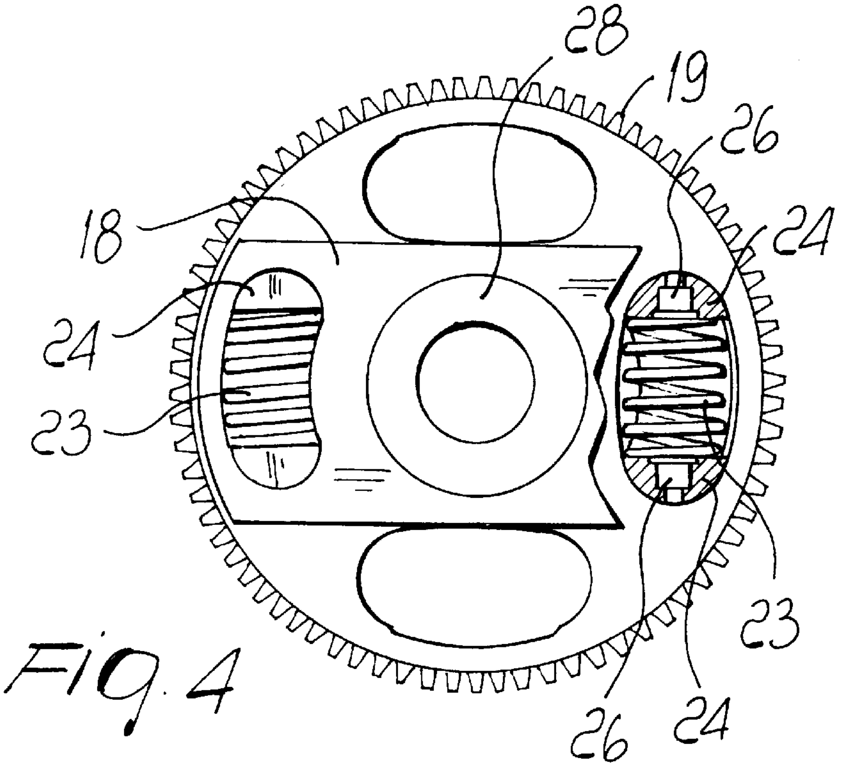
Figure 5:
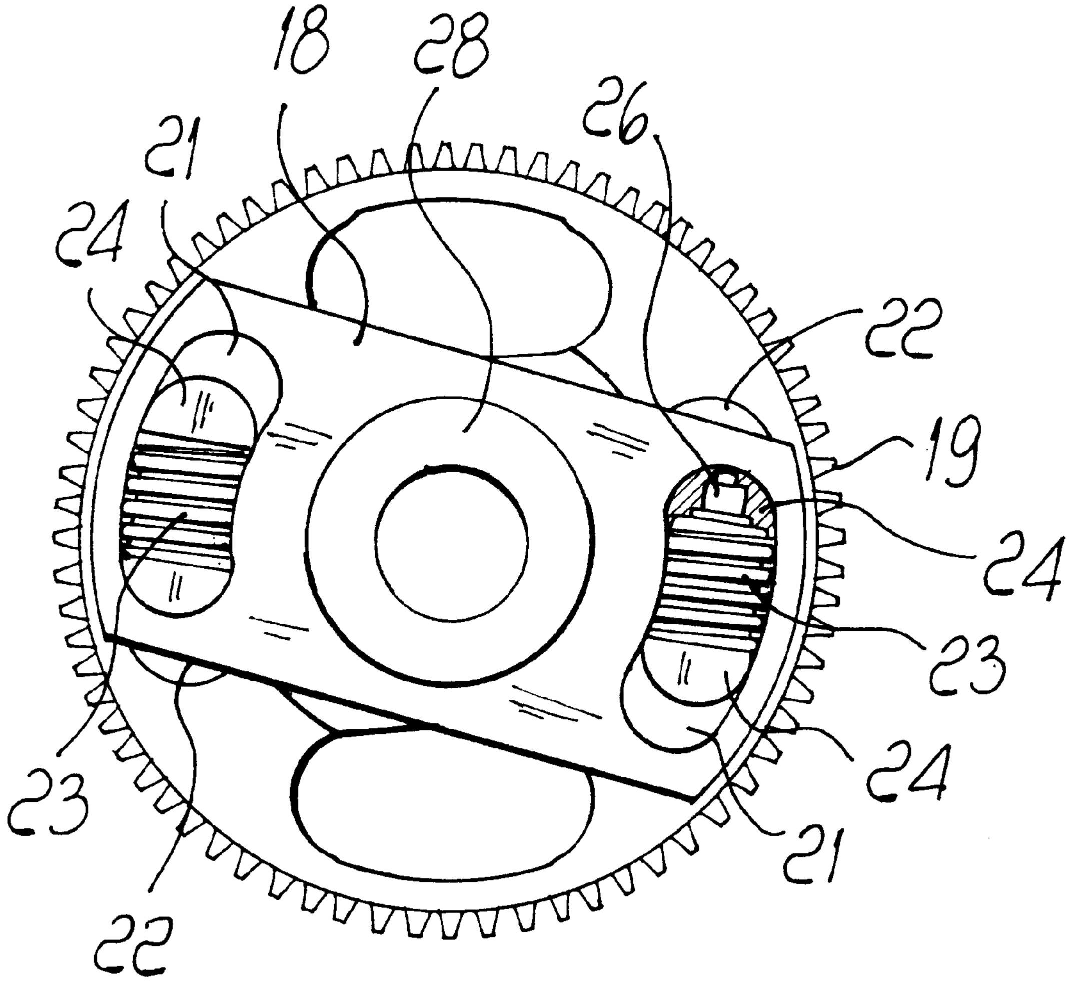
Figure 6:
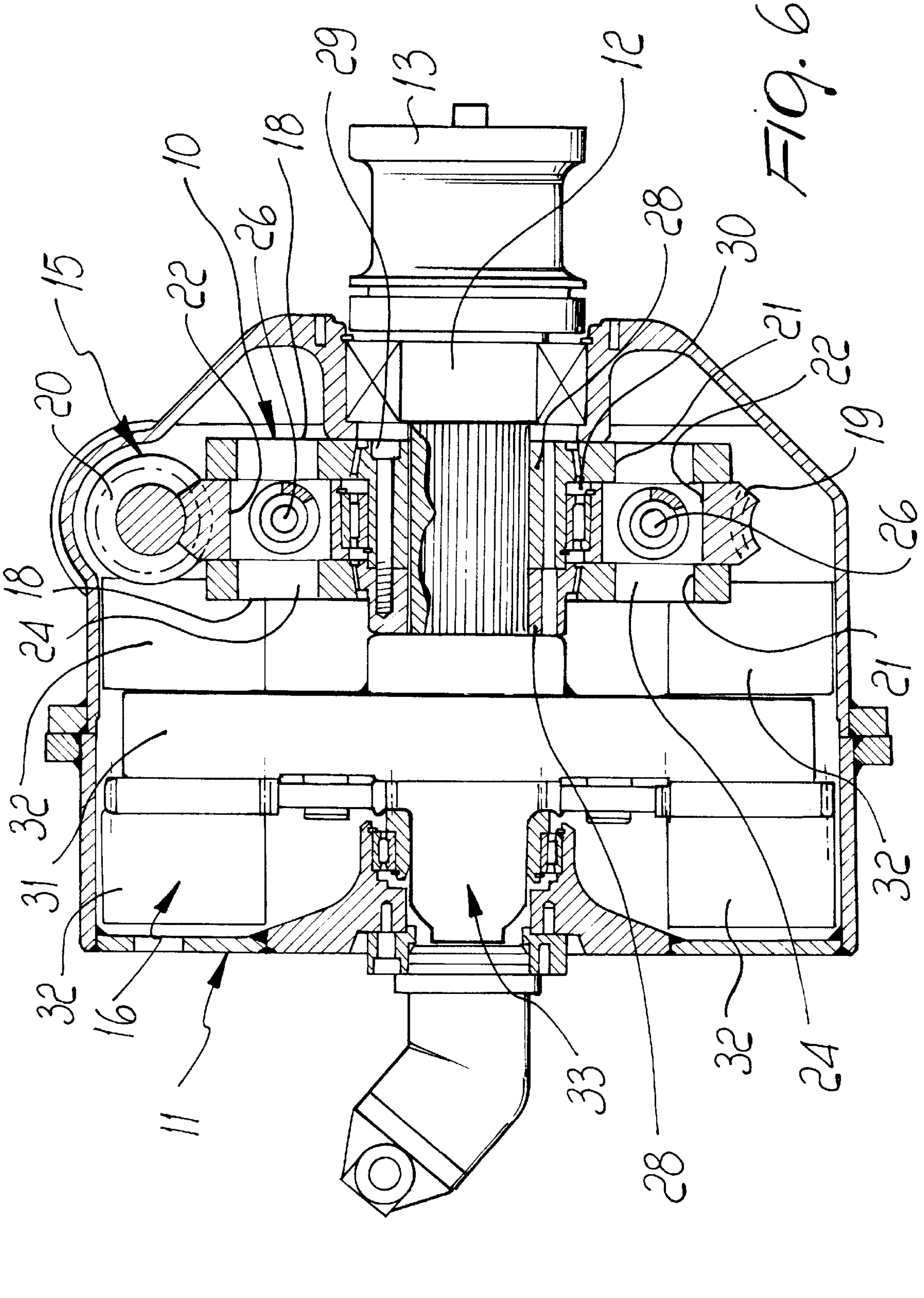
FIG. 6 is a partially sectional orthographic projection view of the device of FIG. 1.
Figure 7:
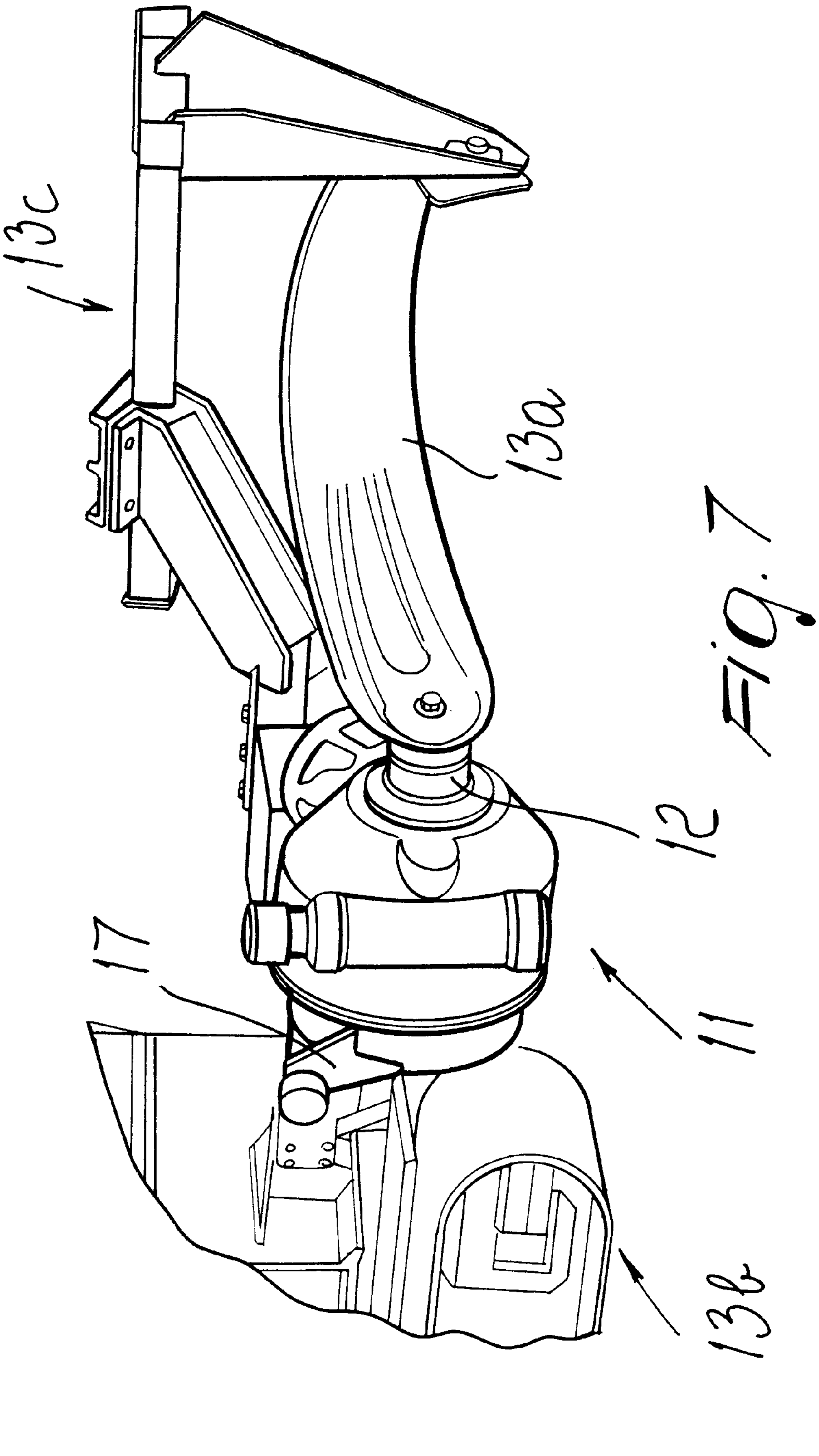
FIG. 7 is perspective view of the device of the preceding figures having a curved blade for removing plants from soil fixed thereto, and being supported by a vehicle.
Figure 8:
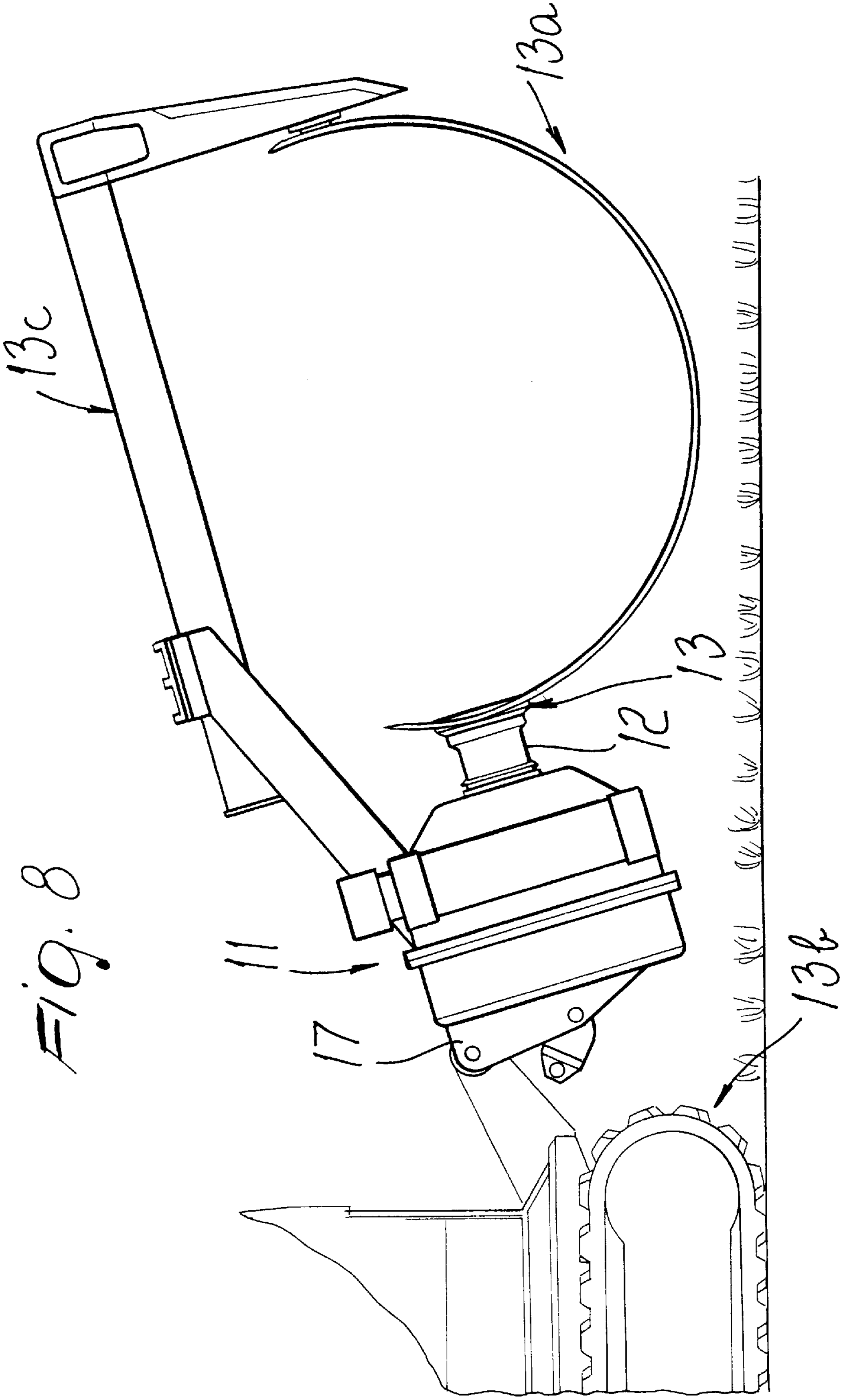
FIG. 8 is an elevational lateral view of the configuration of FIG. 7 with the curved blade rotated towards the ground.

With particular reference to FIGS. 1 to 8, a device for subjecting a shaft to a combined simple rotation and alternating rotation of limited extent about its own axis according to the invention is generally designated by the reference numeral 10.

The device 10 is contained in a housing 11.

In this case, said device 10 moves a shaft 12 on the head 13 of which a curved blade 13*a* is conveniently fixed. Device 10 may be fixed in a frontal position to a vehicle body 13*b*, and one end of the curved blade 13*a* is fixed to the head 13 of the shaft 12 while the other end of the curved blade 13*a* is freely rotatably carried by a rigid blade support 13*c* itself fixed to and extending from the vehicle body 13*b*.

More specifically, the shaft 12 is subjected to a simple rotary motion by means of a hydraulic motor 14 and of a worm-gear reduction unit generally designated by the reference numeral 15.

The shaft 12 is also subjected to an alternating rotation of limited extent by means of a torsional vibration generator, generally designated by the reference numeral 16.

The combined simple rotary motion and alternating rotation of limited extent to which the shaft 12 is subjected, by means respectively of the motor 14 with reduction unit 15 and of the torsional vibration generator, is correspondingly given to the curved blade 13*a* connected to the head 13 of the shaft 12, for providing an effective means for removing plants from soil by the curved blade 13*a* which efficiently cuts the roots of the plant and makes a sod of the soil remain with the cut roots.

The device 10, the reduction unit 15, and the generator 16 are all accommodated within the same housing 11, which is in turn supported by means of brackets 17 by the vehicle body 13*b*.

The simultaneous application of the simple rotation and of the alternating rotation of the shaft 12 is possible indeed by virtue of the device 10 according to the invention, which kinematically connects the reduction unit 15 to said shaft 12, allowing appropriately damped oscillations therebetween.

The device 10 comprises two supporting plates 18 which rotate together with the shaft 12; between said plates a ring gear 19 is provided which belongs to the reduction unit 15.

The ring gear 19 rotates freely with respect to the shaft 12 and is associated with rotation actuation means, constituted by the hydraulic motor 14, the power whereof is transmitted by means of a worm gear 20 which, together with said ring gear 19, constitutes the reduction unit 15.

First slotted holes 21 are formed in each one of the plates 18 so that they are diametrically opposite from each other with respect to the shaft 12; upon assembly, said first slotted holes are arranged so as to correspond to second slotted holes 22 formed in the ring gear 19.

Elastic compression means are rigidly coupled between the first holes 21 and the second holes 22 so as to rest thereon with a slight pre-loading force, as specified hereafter.

In this embodiment, the elastic means are constituted by two helical springs 23, the ends of each spring being associated with corresponding shaped elements 24 which are arranged transversely in abutment with respect to two first holes 21 and with respect to a corresponding second hole 22.

Each one of the shaped elements 24 has a flat surface 25, wherein there is provided a seat 26 for a corresponding end of the corresponding helical spring 23, and a curved surface 27, which is shaped complementarily to the surfaces that form the first holes 21 and the second hole 22 against which it abuts.

More specifically, the median region of the curved surface 27 abuts against the surface that forms the corresponding second hole 22, whilst the lateral regions abut against the surfaces that form the corresponding first holes 21.

In this case, the first holes 21 and the second holes 22 are both shaped longitudinally substantially like a circular arc.

In this case, each one of the plates 18 is monolithic with respect to a cylindrical and axially perforated body 28, the inner surface whereof is shaped so as to form a splined coupling with the shaft 12.

The bodies 28 of the plates 18 are also rigidly fixed to each other by means of threaded elements 29.

In this case, one of the bodies 28 also rotatably supports the ring gear 19 by means of bearing systems 30.

In this embodiment, the torsional vibration generator 16 is substantially constituted by a rocker-like element 31, which has a splined coupling with the shaft 12 and the arms whereof rotatably support, at their ends, rotating masses 32 which are rotated by a geared transmission generally designated by the reference numeral 33.

In practice it has been observed that the present invention has achieved its intended aim and objects.

Fatigue tests have in fact shown that part failures no longer occur.

For an equal power rating, dimensions are smaller than in conventional devices. The configuration of the torsional vibration generator 16 together with the device 10 connected to the reduction unit 15 and all contained in the housing 11 in the manner as described permit to reduce the dimensions of the inertial masses of the entire configuration which advantageously leads to increased efficiency of the vibration generator 16. The overall reduction in the quantity of mass put into oscillation leads to an increased speed with which the vibration generator reaches its state of dynamic equilibrium in oscillation, leading to an improved performance from the start of the cutting operation. Moreover, the provision of the device 10, torsional vibration generator 16, and reduction unit 15 all contained inside the housing 11 leads to greater security in use since the operators are not exposed to dangerous moving parts.

It should also be noted that the springs always act by compression and never by traction, this being more adapted to their structural characteristics.

The constructive simplicity of the present invention, which facilitates any maintenance work and production assembly, should also be noted.

In practice, the materials employed, so long as they are compatible with the contingent use, as well as the dimensions, may be any according to the requirements.

The contents of prior application Ser. No. 08/800,493 filed on Feb. 14, 1997, for which priority is claimed, are incorporated herein by reference.

What is claimed is:

1. A blade actuator comprising a shaft being rotatable about a shaft axis of said shaft with a combined simple rotation and an alternating rotation of limited extent, and a blade connected to said shaft so that said blade is also rotatable substantially about said shaft axis with said combined simple rotation and said alternating rotation of limited extent, said blade actuator further comprising:

two supporting plates coupled directly with said shaft so as to rotate together with said shaft about said shaft axis;

a vibration generator coupled to said shaft and subjecting said shaft to said alternating rotation of limited extent about said shaft axis;

a gear mounted between said two supporting plates such that said plates are positioned at respective opposite faces of said gear, said gear being freely rotatable with respect to the shaft and with respect to said two supporting plates about said shaft axis;

a rotation actuation device associated with said gear for rotating said gear about said shaft axis;

two pairs of first slotted holes, one respective pair of said two pairs of said first slotted holes being formed in a respective one of said plates and said two pairs of said first slotted holes being mutually diametrically opposite with respect to the shaft, and said two pairs being positioned mutually facing in a direction parallel to the direction of said shaft axis;

a pair of second slotted holes formed in said gear such that said two pairs of mutually facing first slotted holes are arranged in a position corresponding to that of the second slotted holes;

two pairs of shaped elements, each pair of said two pairs of shaped elements comprising two shaped elements which are mutually oppositely arranged in contact with respective mutually opposite end profile surfaces of one of said pair of said slotted holes and of respective mutually facing first slotted holes of said two supporting plates; and elastic elements which are coupled between respective facing surfaces of each of said two pairs of shaped elements.

2. The blade actuator according to claim 1, wherein said elastic elements comprise two helical springs.

3. The blade actuator according to claim 1, wherein each one of said shaped elements has: a flat surface, said flat surface comprising a seat for a corresponding end of a related one of said elastic elements; and a curved surface shaped complementarily to the end profile surfaces, said curved surface having a median region thereof abutting against a profile surface that forms a corresponding one of said second slotted holes, and lateral regions thereof abutting against profile surfaces of said respective mutually facing first slotted holes of said two supporting plates.

4. The blade actuator according to claim 2, wherein said first slotted holes and said second slotted holes are both shaped longitudinally as a circular arc.

5. The blade actuator according to claim 1, further comprising cylindrical bodies and wherein each one of said supporting plates is monolithically associated with one of said cylindrical bodies, said cylindrical bodies being perforated axially with an inner surface thereof being shaped to form a splined coupling with said shaft.

6. The blade actuator according to claim 5, wherein said gear forms part of a worm-gear reduction unit, said reduction unit further comprising a worm gear, and said gear being constituted by a ring gear interposed between said supporting plates, said worm gear meshing with said ring gear.

7. The blade actuator according to claim 6, further comprising threaded elements, said supporting plates being rigidly fixed to each other at said cylindrical bodies through said threaded elements.

8. The blade actuator according to claim 7, further comprising bearing systems, at least one of said two cylindrical bodies rotatably supporting said ring gear through said bearing systems.

9. The blade actuator according to claim 1, wherein said vibration generator comprises a rocker element coupled directly to said shaft, said rocker element having rotating masses which are arranged circumferenterally about said shaft axis and which are rotated by a geared transmission forming part of said vibration generator.

10. The blade actuator according to claim 9, further comprising a single housing, said gear and said vibration generator and said supporting plates all being contained in the single housing.

11. An actuator comprising a shaft being rotatable about a shaft axis of said shaft with a combined simple rotation and an alternating rotation of limited extent, said actuator further comprising:

two supporting plates coupled directly with said shaft so as to rotate together with said shaft about said shaft axis;

a vibration generator coupled to said shaft and subjecting said shaft to said alternating rotation of limited extent about said shaft axis, said vibration generator comprising a rocker element coupled directly to said shaft, said rocker element having rotating masses which are arranged circumferenterally about said shaft axis and which are rotated by a geared transmission forming part of said vibration generator;

a gear mounted between said two supporting plates such that said plates are positioned at respective opposite faces of said gear, said gear being freely rotatable with respect to the shaft and with respect to said two supporting plates about said shaft axis;

a rotation actuation device associated with said gear for rotating said gear about said shaft axis;

two pairs of first slotted holes, one respective pair of said two pairs of said first slotted holes being formed in a respective one of said plates and said two pairs of said first slotted holes being mutually diametrically opposite with respect to the shaft, and said two pairs being positioned mutually facing in a direction parallel to the direction of said shaft axis;

a pair of second slotted holes formed in said gear such that said two pairs of mutually facing first slotted holes are arranged in a position corresponding to that of the second slotted holes;

two pairs of shaped elements, each pair of said two pairs of shaped elements comprising two shaped elements which are mutually oppositely arranged in contact with respective mutually opposite end profile surfaces of one of said pair of said slotted holes and of respective mutually facing first slotted holes of said two supporting plates; and elastic elements which are coupled between respective facing surfaces of each of said two pairs of shaped elements.

12. The actuator according to claim 11, wherein said elastic elements comprise two helical springs.

13. The actuator according to claim 11, wherein each one of said shaped elements has: a flat surface, said flat surface comprising a seat for a corresponding end of a related one of said elastic elements; and a curved surface shaped complementarily to the end profile surfaces, said curved surface having a median region thereof abutting against a profile surface that forms a corresponding one of said second slotted holes, and lateral regions thereof abutting against profile surfaces of said respective mutually facing first slotted holes of said two supporting plates.

14. The blade actuator according to claim 12, wherein said first slotted holes and said second slotted holes are both shaped longitudinally as a circular arc.

15. The blade actuator according to claim 11, further comprising cylindrical bodies and wherein each one of said supporting plates is monolithically associated with one of said cylindrical bodies, said cylindrical bodies being perforated axially with an inner surface thereof being shaped to form a splined coupling with said shaft.

16. The actuator according to claim 15, wherein said gear forms part of a worm-gear reduction unit, said reduction unit further comprising a worm gear, and said gear being constituted by a ring gear interposed between said supporting plates, said worm gear meshing with said ring gear.

17. The actuator according to claim 16, further comprising threaded elements, said supporting plates being rigidly fixed to each other at said cylindrical bodies through said threaded elements.

18. The actuator according to claim 17, further comprising bearing systems, at least one of said two cylindrical bodies rotatably supporting said ring gear through said bearing systems.

19. The actuator according to claim 11, further comprising a single housing, said gear and said vibration generator and said supporting plates all being contained in the single housing.

* * * * *